Patented June 1, 1954

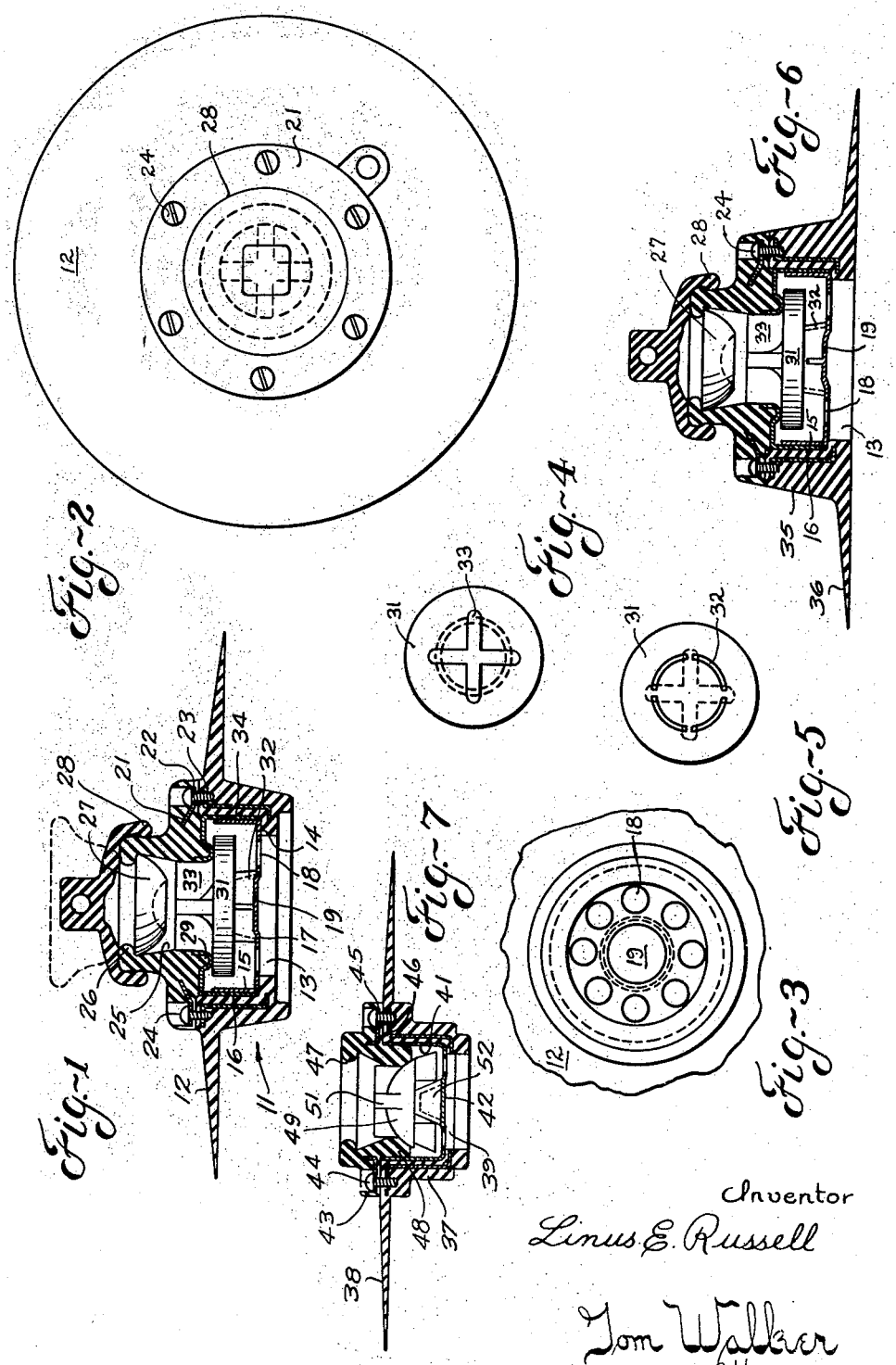

2,679,857

UNITED STATES PATENT OFFICE 2,679,857

ADJUSTABLE REINFORCED MOLDED INFLATOR VALVE

Linus E. Russell, Springfield, Ohio, assignor to Peters & Russell, Inc., Springfield, Ohio, a corporation of Ohio Application July 30, 1951, Serial No. 239,333

9 Claims. (Cl. 137—232)

This invention relates to inflator valves, and particularly in inflator valves as applied to collapsible rubber boats and the like.

The object of the invention is to improve the construction as well as the means and mode of operation of inflator valves, whereby they may not only be economically and easily manufactured and assembled, but will be more efficient and fool-proof in use, capable of being quickly operated, unlikely to get out of repair, and having relatively few parts.

An object of the invention is to provide an inflator valve in complete unit form ready for installation in the article to be inflated.

Another object of the invention is to construct the valve with inexpensive, durable parts made of a material having an affinity for the material of which the article to be inflated is made, for example, molded rubber.

A further object of the invention is to make the valve assembly corrosion and wear resistant, all the exposed parts being made of a molded plastic material.

Still another object of the invention is to introduce a novel and effective valve control in part characterized by an arrangement providing for alternative opening means for the valve, and in other part by the use of a resilient, deformable webbing or skirt on the valve for holding it yieldingly in closed position.

A further object of the invention is to provide an inflator valve possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is found the preferred but obviously not necessarily the only form of embodiment of the invention, Fig. 1 is a view in longitudinal section of a first embodiment of the invention;

Fig. 2 is a top plan view of the valve of Fig. 1;

Fig. 3 is a bottom plan view, partly broken away, of the valve of Fig. 1;

Fig. 4 is a top plan view of the valve element of Fig. 1;

Fig. 5 is a bottom plan view of the valve element of Fig. 1;

Fig. 6 is a view similar to Fig. 1, showing a modified embodiment of the invention; and Fig. 7 is a view similar to Figs. 1 and 6, showing another form of inflator valve in accordance with the instant invention.

Like parts are indicated by similar characters of reference throughout the several views.

Referring to Figs. 1–5 of the drawings, an inflator valve in accordance with this illustrative embodiment of the invention includes a body portion 11 made of a relatively soft rubber or rubber-like material. The body 11 has a flange 12 of tapered thickness to facilitate its being vulcanized or otherwise bonded to the article to be inflated. The body 11 is tubular in shape, having a through bore 13 and a counterbore 14, the latter opening through what will be considered as the upper end of the body 11.

Seated in the bottom of the counterbore 14 is a cup-shaped metallic member 15 having a vertical side wall 16 and a base 17, the latter extending as a partition transversely across the bore 13 and having a circular series of longitudinal openings 18. At its center, the base partition 17 is slightly extruded to define an elevated land 19.

Seated on the top of the body 11 is a closure therefor or body extension 21 made of the same material as the body. A flat metallic ring 22 is molded in the extension 21. A somewhat similar ring 23 is molded in the body 11, the latter ring having a portion parallel to the ring 22, lying near the top of the body, and also a dependent sleeve portion which extends downward through the body to achieve a strengthening result. A detachable connection between the body 11 and the extension 21 is accomplished through screw studs 24 which extend downwardly through the extension and have a screw threaded engagement with the ring 23 in the body 11. It will be understood that on account of the resilience of the material of which the body 11 and extension 21 are made some slight relative axial adjustment therebetween is possible through tightening and loosening of the studs 24.

The extension 21 provides a bore 25 aligned with the body bore 13. At its upper end the wall of bore 25 is inturned as a flange 26 which is constructed and arranged to grip a pressure fluid discharge nozzle which may be inserted in the bore 25. When the inflator valve is not in use the flange grips a removable cap or plug 27 which has a body portion to be received in the bore 25 and a deformable hood 28 arranged to surround and sealingly embrace the extension 21 at the upper end of bore 25.

At its lower end the wall of bore 25 terminates in a rounded protruding portion 29 constituting a valve seat. Cooperable with the valve seat 29 is a valve disc 31 reciprocable in the counterbore 14 of the body 11. The disc 31 is made of a rubber or rubber-like material. Molded integrally therewith are a skirt 32 on its lower surface and radial guide flanges 33 on its upper surface. The skirt 32 is made relatively soft and resilient and rests on the transverse partition 17 in surrounding relation to the land 19 thereon. Its length and the relative axial position of adjustment of the body 11 and extension 21 are such that the skirt 32 tends normally to hold the valve disc 31 yieldingly on the seat 29. Being relatively soft and deformable, however, the skirt 32 will allow the valve disc to be moved off its seat under the force of pressure fluid or positively applied pressure.

The radial guide flanges 33 have a sliding fit in a cylindrical portion of bore 25 so as to maintain the valve disc 31 parallel to the plane of the seat 29. Being projected normally upward in the bore 25, the guide flanges 33 may also be utilized to present an abutment surface to a pressure fluid discharge nozzle. Thus, as a part of the operation by which the discharge nozzle is inserted in the bore 25, the nozzle may be made to act through the flanges 33 to move the valve disc 31 downwardly or to a disengaged position with respect to the valve seat 29. Alternatively, the valve disc may be unseated by the force of pressure fluid alone as admitted to the top thereof through the discharge nozzle. In either event, pressure fluid admitted to the valve assembly, flows around the valve disc 31, through partition 17 by way of openings 18 therein and out the lower or inner end of bore 13 to the interior of the article to be inflated. Upon discontinuance of the supply of pressure fluid, the valve disc 31 is returned to seated or closed position by a combination of the resilient action of skirt 32 and back pressure applied through the lower end of bore 13.

The inflator valve assembly of Figs. 1–5 further includes a metallic liner member 34. This member has an approximately inverted cup shape with a central opening in the base corresponding to and aligned with the bore 25. The side wall of the member 34 has a press fit in the counterbore 14, outside member 15, and its base portion extends in intimately contacting conforming relation to the valve seat 29.

In Fig. 6 a modified form of the invention is disclosed. The elements and mode of operation of this valve are identical to those of Figs. 1–5 except for a slightly different body portion. In the instance of Fig. 6, a body 35 is provided which is the same as the body 11 of Figs. 1–5 except that the attaching flange 36 thereof occurs at the lower end of the body instead of at the upper end. Thus the whole of the valve assembly is on the surface of or outside the article to be inflated, instead of being partly within it as in the case in Fig. 1.

The valve assembly of Fig. 7 presents a somewhat modified concept wherein both the body and body extension are made smaller for an overall reduction in size and wherein the liner member 34 of Fig. 1 is omitted. In this instance a body portion 37 has an integral mounting flange 38, a through bore 39 and counterbore 41, in the latter of which is installed a cup-shaped member 42 corresponding to the member 15 of Fig. 1.

A body extension 43 is attached to the top of body 37, by screws 44 extending between respective integral strengthening members 45 and 46. The body extension 43 has a through bore in the upper end of which is a detent flange 47 and the lower end of which is defined by a dependent sleeve 48 received in the cup member 42. The bottom of sleeve 48 functions as a valve seat, being engageable by a half-round valve element 49 reciprocable in the counterbore 41. Guide flanges 51 are on the top of the valve 49 and a resilient deformable skirt 52 on the bottom thereof, the former serving the same dual purpose as flanges 33 of Fig. 1 and the latter performing the same function as skirt 32 of Fig. 1.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. An inflator valve, including a tubular body made of a relatively soft molded plastic material, a tubular closure for said body made of a similar material and having a flange overlying the end of said body, relatively stiff strengthening members molded in the material of said body and in the flange of said closure respectively, removable fastening devices extending between said strengthening members to hold said body and closure in assembled relation and adjustable to effect a limited relative axial motion between said body and said closure, an annular projection on said closure protruding into the hollow interior of said body to define a valve seat, and a valve reciprocable in said body to engage and disengage said seat.

2. An inflator valve, including a tubular body assembly comprising first and second axially aligned body portions made of a relatively soft plastic material, said second portion being of smaller bore than said first portion and having at its inner end a circular valve seat and at its outer end an inturned flange to act as a seal and detent, a valve disc reciprocable in said first body portion to and from a position on said valve seat, a cup shaped metallic member installed in said first body portion and presenting a perforate transverse partition wall spaced from said valve seat, a skirt on said valve disc made of a resilient deformable material and resting on said partition wall to thereby yieldingly hold said valve disc upon said valve seat.

3. An inflator valve according to claim 2, characterized by a guide on said valve disc extending therefrom in opposed relation to said skirt and slidingly received in said second body portion.

4. An inflator valve according to claim 2, characterized by a metallic liner member inserted in said first body portion in surrounding relation to said cup-shaped member and extending in intimately contacting conforming relation to said valve seat.

5. An inflator valve, including a tubular body assembly comprising first and second axially aligned body portions made of a relatively soft plastic material, each of said body portions having an axial through bore, a counterbore forming a portion of one of said bores, a metallic member seated in said counterbore and presenting a perforate transverse partition wall, a valve disc reciprocable in said counterbore, a resilient skirt on said disc resting on said partition wall, a valve seat formed on the adjacent end of the other one of said bores, and means for making slight relative axial adjustments of said body portions to cause said valve seat to approach or withdraw from said partition wall.

6. An inflator valve according to claim 5, characterized in that said last named means comprises interconnecting fastening devices adjustable to squeeze said body portions together with a varying intensity.

7. An inflator valve, including a tubular body portion made of a relatively soft, plastic material, a counterbore forming a portion of the bore in said body, a metallic member seated in said counterbore and presenting a perforate, transverse partition wall, a valve disc resting on said partition wall, another body portion resting on the first said portion and having a bore in alignment with the bore of the first said body portion, one end of which latter body portion protrudes into said counterbore and is formed with a valve seat engaged by said valve disc, said other body portion being made of a like material as said first body portion, and interconnecting means between said body portions adjustable to effect a greater or lesser compression of the material thereof and thereby to effect approaching and withdrawing motions of said valve seat relatively to said partition wall.

8. An inflator valve according to claim 7, characterized by an inturned flange at the other end of said bore defining a seal and a detent.

9. An inflator valve according to claim 8, characterized in that said other body portion is formed with an outturned flange overlying the first said body portion and with a first tubular portion extending outward and having said inturned flange formed therein, and with an oppositely disposed tubular portion received in said counterbore and forming said protruding end with said valve seat.

References Cited in the file of this patent

UNITED STATES PATENTS

| Number | Name | Date |
|---|---|---|
| 244,468 | McElroy | July 19, 1881 |
| 1,758,625 | Saul | May 13, 1930 |
| 2,103,822 | Perry | Dec. 28, 1937 |
| 2,106,638 | Hillier | Jan. 25, 1938 |
| 2,106,671 | Watson | Jan. 25, 1938 |
| 2,355,862 | Harper | Aug. 15, 1944 |
| 2,387,433 | Fenton | Oct. 23, 1945 |

FOREIGN PATENTS

| Number | Country | Date |
|---|---|---|
| 435,273 | Great Britain | Sept. 18, 1935 |